United States Patent [19]

Lysen et al.

[11] Patent Number: 4,864,148

[45] Date of Patent: Sep. 5, 1989

[54] DEVICE FOR DETERMINING AND MONITORING CHANGES IN THE POSITION OF SHAFTS

[76] Inventors: Heinrich Lysen, Kirchenstrasse 95, D-8000 München 80; Dieter Busch, Am Isarberg 1, D-8045 Ismaning; Karl Wagner, Wackneroderstrasse 8, D-8000 München 83, all of Fed. Rep. of Germany

[21] Appl. No.: 64,183

[22] PCT Filed: Jul. 29, 1986

[86] PCT No.: PCT/EP86/00446

§ 371 Date: Apr. 30, 1987

§ 102(e) Date: Apr. 30, 1987

[87] PCT Pub. No.: WO87/01439

PCT Pub. Date: Mar. 12, 1987

[51] Int. Cl.⁴ .......................................... G01N 21/86
[52] U.S. Cl. .................................... 250/561; 356/152
[58] Field of Search ............... 250/201, 216, 560, 561; 356/141, 152, 399, 400

[56] References Cited

U.S. PATENT DOCUMENTS

| | | | |
|---|---|---|---|
| 2,703,505 | 3/1955 | Senn | 356/400 |
| 3,603,691 | 9/1971 | Hamilton | 356/400 |
| 4,518,855 | 5/1985 | Malak | 250/201 |
| 4,627,725 | 12/1986 | Nishio et al. | 356/141 |
| 4,698,491 | 10/1987 | Lysen | 250/561 |

Primary Examiner—David C. Nelms
Attorney, Agent, or Firm—Robert W. Fiddler

[57] ABSTRACT

An apparatus for detecting and monitoring changes in the position of rotating shafts in which a light ray generally parallel to the shafts is directed to measurement positions (which are offset from each other by about 90° in the circumferential direction of the shafts) to a rectangular prism, which reflects the ray to a ray receiver, which supplies signals, which change with any change in the position of the shafts. In known apparatus for making possible a continuous monitoring of the alignment condition of coaxial shafts, the ray source and the ray receiver are arranged on one shaft and a prism is arranged on the other. The signals of the ray receiver and the power supply thereof require the use of complex and unreliable transmission means between the rotating and stationary parts of the apparatus. According to the invention light rays (S and S'), come from two separate source-receiver pairs ($2_1, 9_1$, and $2_2$ and $9_2$) each pair having a ray source and a ray receiver which are fixed in a reference system (X,Y and M) in which the shaft or shafts rotate. As a result it is possible to dispense with complex and unreliable transmitting means for the signals from the receivers and for the power supply to the pairs of sources and receivers. The apparatus in accordance with the invention is suited both for the monitoring of the position of a single rotating shaft and also for the continuous monitoring of the alignment condition of coaxial shafts.

11 Claims, 5 Drawing Sheets

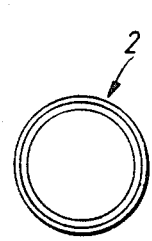
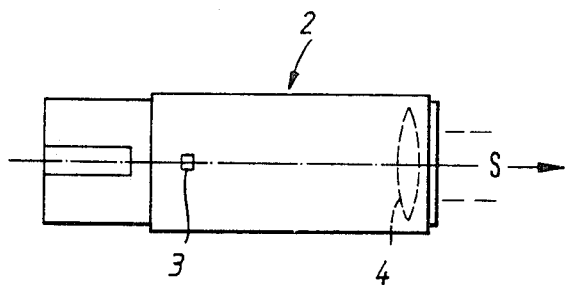
Fig. 4          Fig. 3
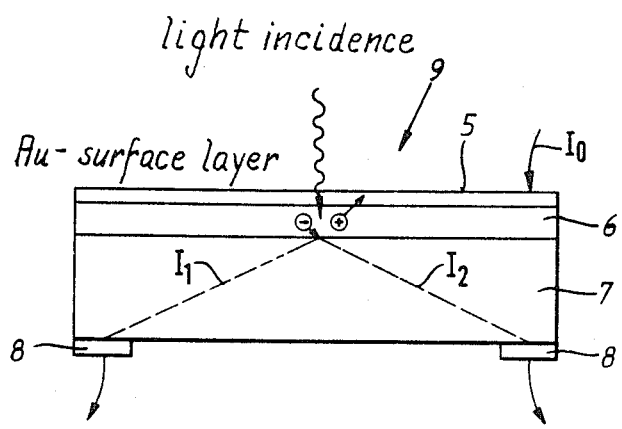
Fig. 5

DEVICE FOR DETERMINING AND MONITORING CHANGES IN THE POSITION OF SHAFTS

This invention relates to apparatus for detecting and monitoring shaft position and changes in position of rotating shafts.

In known apparatus of this type, U.S. Pat. No. 4,698,491, a ray source with an associated ray receiver is mounted on one shaft while another shaft with which it is to be aligned supports a prism. The ray source continuously directs a light ray towards the prism which continuously reflects the light ray back to the ray receiver. A special clocking device is associated with the rotating shafts permitting output signals supplied by the ray receiver to be related to the position of the light ray. In addition to the clocking device it is necessary to have transmitting means such as slip rings with slip ring brushes, transmitters and the like consisting of a rotor and a stator for the transmission of the output signals supplied by the ray receiver, from the one rotating shaft to the processing device.

In order to improve upon the above-mentioned involved and unreliable transmitting means the German unexamined specification No. 3,419,059 describes an arrangement with a number of ray sources, ray receivers and prisms aimed at each other in different positions on the base or housing of two machines, whose shafts are to be monitored so that it is only the changes in the relative position of the two machines which are detected and monitored. This known device only detects such changes in the relative position of the shafts as are a cause of changes in the relative position of the machines. However it is also possible for machines which are coupled together to undergo a change in the relative shaft positions, for example owing to bearing wear, without this involving a change in the relative position of the machine. Such changes, which also lead to critical operational conditions, are not detected by the last-mentioned known device.

An object of the invention is to devise an apparatus for direct monitoring of shaft position in such a way that the previously employed involved and unreliable means for transmission of position signals from the receiver side and position signals from one rotating shaft to the processing means may be dispensed with.

In the apparatus in accordance with the invention it is not necessary for any electrical position signals to be transmitted from one rotating shaft to a stationary processing device, because it is only the prisms, at least one of which is mounted on each shaft, that rotate with the shafts and by way of respective light rays cooperate with the respective ray receivers included in the receiver system. The position of each shaft is monitored in a manner incorporated in the reference system and the electrical position signals produced may be compared with stored output signals and employed for monitoring the shaft position and detecting departures in position from initial positions.

The apparatus in accordance with the invention is suitable both for monitoring individual shafts in a reference system and also for monitoring the proper alignment of two coaxial shafts, and more especially elastically coupled shafts connecting two machines mounted with a clearance therebetween.

The invention will now be described in detail with reference to the drawing which shows embodiments thereof.

FIG. 3 shows a lateral view of the laser diode employed in the apparatus of the invention as a ray source.

FIG. 4 shows the laser diode of FIG. 3 end-on and looking towards the ray outlet.

FIG. 5 shows an analogous photoelectric semi-conductor position detector, used in the apparatus of the invention as a ray receiver, in section to indicate the principle of operation.

In the illustrated embodiments of the invention, rectangular prisms, ray sources and ray receivers are employed, whose structure and workings are explained.

Figure 1:
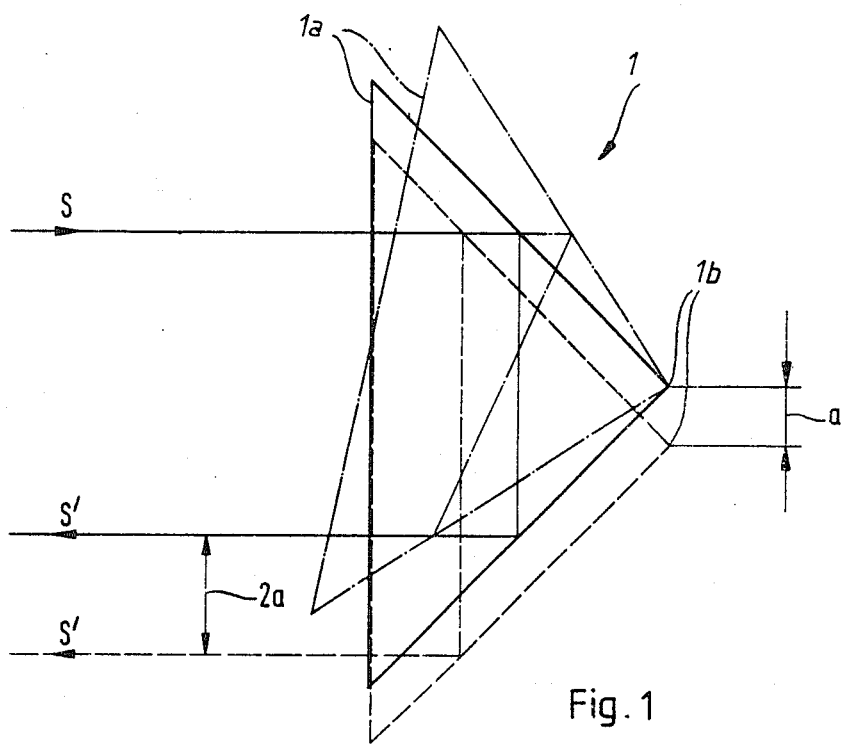
FIG. 1 shows one of the rectangular prisms used in the apparatus of the invention as seen from the side and in different angular settings in relation to the incident light.
Figure 2:
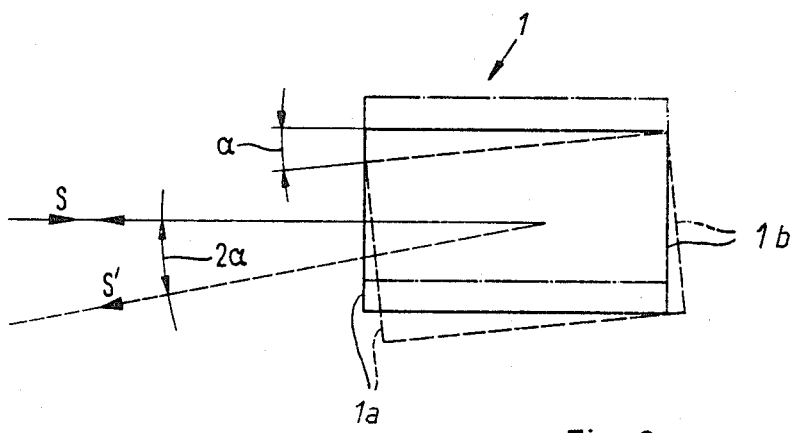
FIG. 2 shows the prism from above in two different angular settings with reference to the incident light ray.

When a ray S of light shines onto the prism 1 shown in FIGS. 1 and 2 so as to be normal to the hypotenuse plane 1a, it will be reflected as a ray S' in a direction normal thereto. This applies for the center axes of the light ray even if the incident and emergent rays are partly coincident, as will for example be the case if the incident ray S has a relatively large diameter and is shone into the apex of the prism. If the prism is tilted about an axis normal to the apex line 1b, that is to say normal to the plane of the drawing in FIG. 1, there will be no change in the reflection. Any change in the angle of incidence of the light in the plane of the drawing of FIG. 1 will thus have no influence on the reflection situation.

Any sliding of the prism in a direction parallel to the hypotenuse plane 1a and parallel to the plane of the drawing of FIG. 1 on the other hand will cause twice the effect on the distance between the incident and the emergent rays.

On the other hand, tilting the prism 1 about an axis normal to the apex line 1b and parallel to the hypotenuse plane 1a will lead to a change in the angle of reflection in a direction normal to the plane of the drawing in FIG. 1 with twice the effect of the tilting, this being indicated in FIG. 2.

A light source suitable for the production of the light ray S is diagrammatically indicated in FIGS. 3 and 4.

In these figures the ray source has a laser crystal 3 and a collimating lens 4 and is able to produce a laser ray S with an extremely small degree of divergence of the order of 1 mrad. The ray receiver used in the embodiments of the apparatus in accordance with the invention described in what follows may in accordance with FIGS. 5 through 7 be a biaxial, analog photoelectrical semi-conductor detector, which has a covering layer 5 of gold on a depletion zone 6, which in turn is on a high-ohmic substrate 7, the gold cover layer 5 being supplied with a current $I_o$. To the side of the high-ohmic substrate over and under it there are contact strips (running along the generally square cross section of the substrate) via which the supplied current $I_o$ flows away divided up into current fractions. The division up of the current $I_o$ will be dependent on the position of light incidence, at which the light ray is shone on the gold cover layer generally at a right angle thereto.

Figure 6:
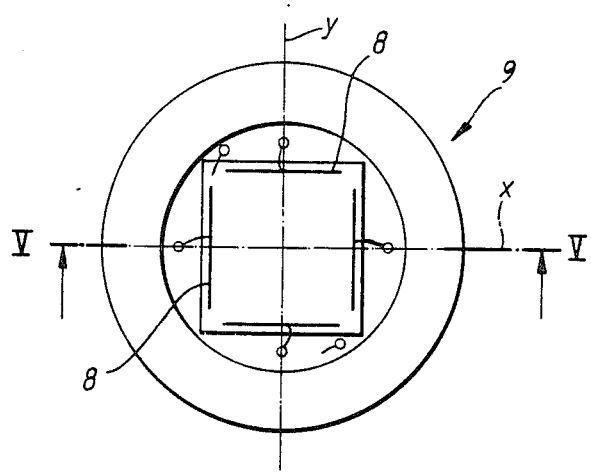
FIG. 6 shows the position detector of FIG. 5 from the front and in a dual axis version.
Figure 7:
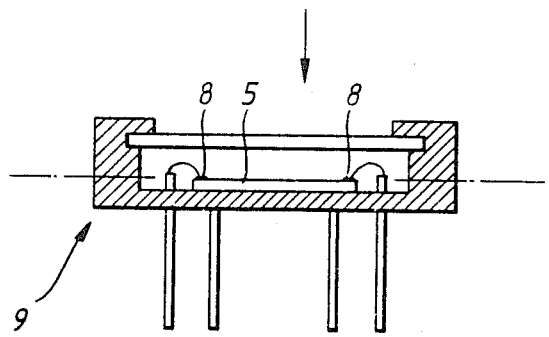
FIG. 7 is a cross section taken through the detector of FIG. 6 taken along the line V—V of FIG. 6.

In the embodiment of the invention of FIGS. 6 and 7, employing a biaxial position detector, the supplied current $I_o$ is split up into four current fractions, which flow away via the individual contract strips 8 and whose size will be dependent on the distance of the point of incidence of the light from the center. Thus if the light ray is exactly incident on the center of the cover layer 5, the four current fractions will be equal in size. On the basis of any current difference at the pairs of contact strips 8, placed opposite to each other, it will be possible to obtain the rectangular components of the distance of an eccentric point of light incidence from the center of the coordinate system, which is to be conceived of as being parallel to the gold cover layer 5.

In the embodiments of the invention described in what follows the position detector of FIGS. 5 through 7, which is generally denoted 9, is so arranged that the one line of symmetry (FIG. 6) corresponding to one coordinate axis) is radial, at least as regards its virtual image, that is to say virtually, to the center axis of the associated shaft to be monitored and the other line of symmetry corresponding to the other axis of the coordinate system, is normal thereto, that is to say parallel to a normal tangent, perpendicular to the selected radial line, at the circumference of the shaft.

Figure 8:
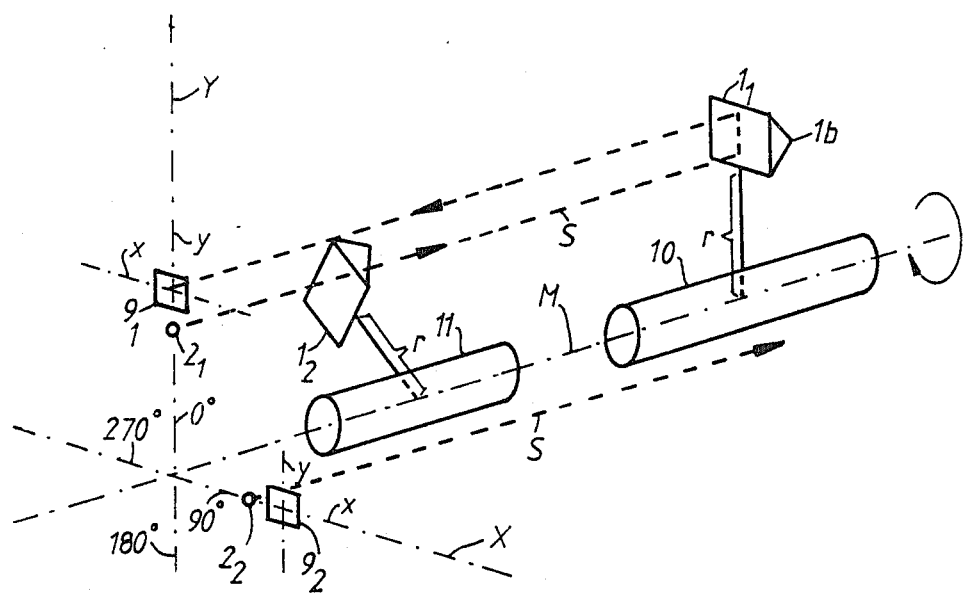
FIG. 8 shows a first preferred embodiment of the apparatus in accordance with the invention in diagrammatic perspective view.
Figure 9:
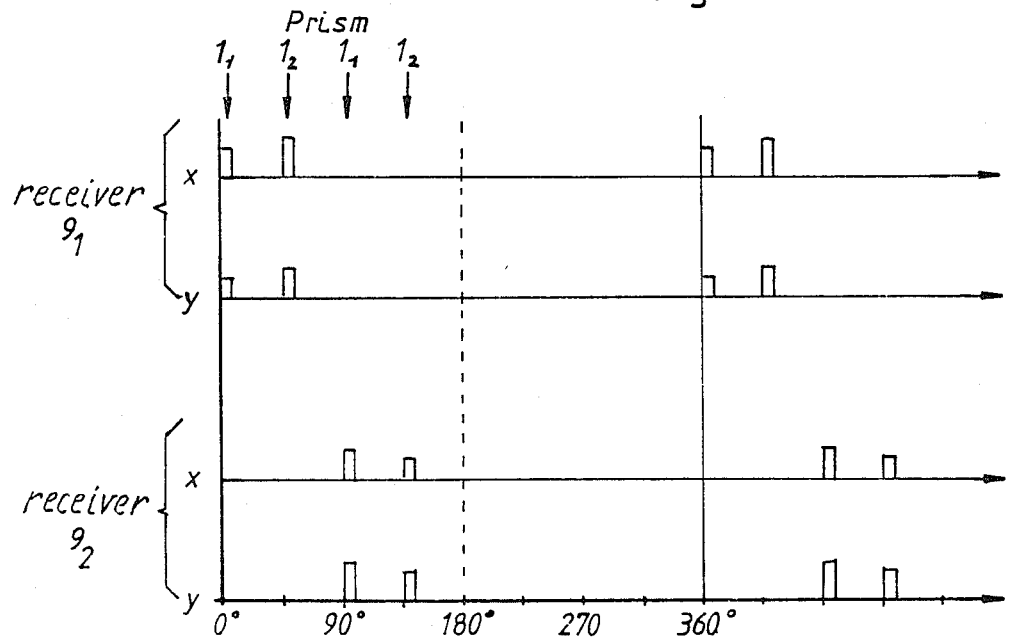
FIG. 9 is a graph of the signals generated in the apparatus of FIG. 8 from the output of the ray receivers.

In the embodiment of the invention illustrated in FIGS. 8 and 9 there are two stationary ray sources $2_1$ and $1_2$, which are arranged so as to be offset by 90° circumferentially about the coaxial shafts 10 and 11 which were initially aligned. The sources are of the same type as previously described and emit parallel light generally parallel to the shafts 10 and 11 in each case in the form of a light ray S. On each of the shafts 10 and 11 there is a respective prism $1_1$ and $1_2$, of the above mentioned type so secured that the light rays, offset by 90° about the shafts, are incident generally normal to the hypotenuse plane of the prisms when said prisms in their circular path about the axis of the shafts intercept respective light rays. In order to ensure that the prism which is to the front in the direction of the light rays does not cover prism to the back thereof, so that it would then prevent either light ray from reaching the rear prism, the prisms $1_1$ and $1_2$ are somewhat offset in the circumferential direction of the shafts 10 and 11 (in the example, by 45°).

The prisms $1_1$ and $1_2$ reflect the light rays S from the sources $2_1$ and $2_2$ to the associated ray receivers $9_1$ and $9_2$ of the above-described type, which are arranged, at least virtually, so that their one coordinate axis coincides with the shaft-related radial line, on which the associated ray source $2_1$ or $2_2$ is arranged, while the other coordinate axis is respectively normal thereto. The ray receivers $9_1$ and $9_2$ are furthermore so arranged that the light ray reflected by the prisms impinges on the ray receiver in the original state of alignment of the shafts substantially at the coordinate center point thereof. Special adjusting means may be provided for such adjustment of the ray receivers.

Adjusting means may also be provided for the ray sources so that the light ray may be optimally aligned with respect to the shafts and the prisms.

In FIG. 8 the ray receivers $9_1$ and $9_2$ are each directly arranged at the respective ray sources $2_1$ and $2_2$. This is however by no means essential. The reflected light rays may also be reflected by reflecting mirrors or the like to an other position at which the ray receivers $9_1$ and $9_2$ are mounted so that care need only be taken to see that the ray source and respective ray receiver are correctly aimed, at least virtually, at each other and at the prisms.

The prisms $1_1$ and $1_2$ are also so arranged on the shafts 10 and 11 with their apex $1b$ case parallel to a normal tangent to the shaft circumference so that a parallel displacement of one shaft leads merely to an increase in the distance between the ray incident on one prism, by which it is then reflected, and thus to a displacement of the point of light ray incidence on the ray receiver in a direction parallel to the radially aligned coordinate axis thereof, whereas a rotation of the respective shaft about an axis normal to the center axis of the shaft will lead to the above mentioned change in the angle between the incident and the outgoing light ray and thus to motion of the point of incidence of the light ray parallel to the other coordinate axis of the ray receiver. The type of the change in the point of incidence at the ray receiver thus provides a clear indication whether the change of the shaft in relation to the respective source and receiver pair and ultimately in relation to the other shaft is (1) a parallel shift, (2) an angular shift, or (3) a combination thereof. Since the measurement is undertaken for each prism and thus for each shaft in two measuring positions offset about the respective shaft by 90°, it is possible to recognize and compute separately every change in the shaft position in space to see the type and direction of the change.

The result of the monitoring process may be continuously indicated and/or used to derive an alarm signal by conventional means which are not shown in the drawing, such alarm signal being given when an amount of misalignment between the two shafts has reached a critical level.

The separately supplied electrical position signals supplied by the ray receivers for the x component and y component of the distance of the point of incidence of the light ray are due to the fact that on the incidence of a light ray on a prism during the course of a rotation of the shafts 10 and 11 the reflected light ray is incident for a short time on the respective light receiver and gives rise to pulse-like electrical signals in accordance with the position of the point of incidence. The sequence in time of these pulses is indicated in the graph of FIG. 9 for the x and y outputs of the ray receivers $9_1$ and $9_2$ separately for a full rotation of the shaft. For monitoring it is not the absolute level of these pulses which is important but the change therein in the course of operation of the machines coupled by the shafts.

Following light ray reflection at one of the prisms the source and receiver pair $2_1$ and $9_1$ measures displacements of the shaft along the X axis of a coordinate system fixed in space and whose coordinate axes extend parallel to the radial coordinate axes of the two ray receivers and whose origin is on the center axis of the shafts, and it furthermore measures rotations about this X axis.

Analogously the source and receiver pair $2_2$ and $9_2$ measures the displacements along the Y axis of this coordinate system fixed in space and also rotation about the latter.

Owing to the arrangement of the prisms on the two shafts offset by the above-noted angle of, for instance 45°, each rotation of the shafts will occasion a series of dual pulse pairs at each ray receiver and from the changes with time in the size of these pulses, using the method of computation given in U.S. Pat. No. 4,698,491. It is possible to unambiguously verify the casual misalignment separately for parallel and angular offset.

The amplitudes of the eight pulses in all for each shaft rotation may be stored at the beginning of monitoring process in a processing circuit and thereafter the later pulses heights may be compared therewith so that it is not important to so adjust the ray sources, the prisms and the ray receivers at the start of monitoring that the reflected light rays are incident precisely at the coordinate center point on the ray receivers.

Figure 10:
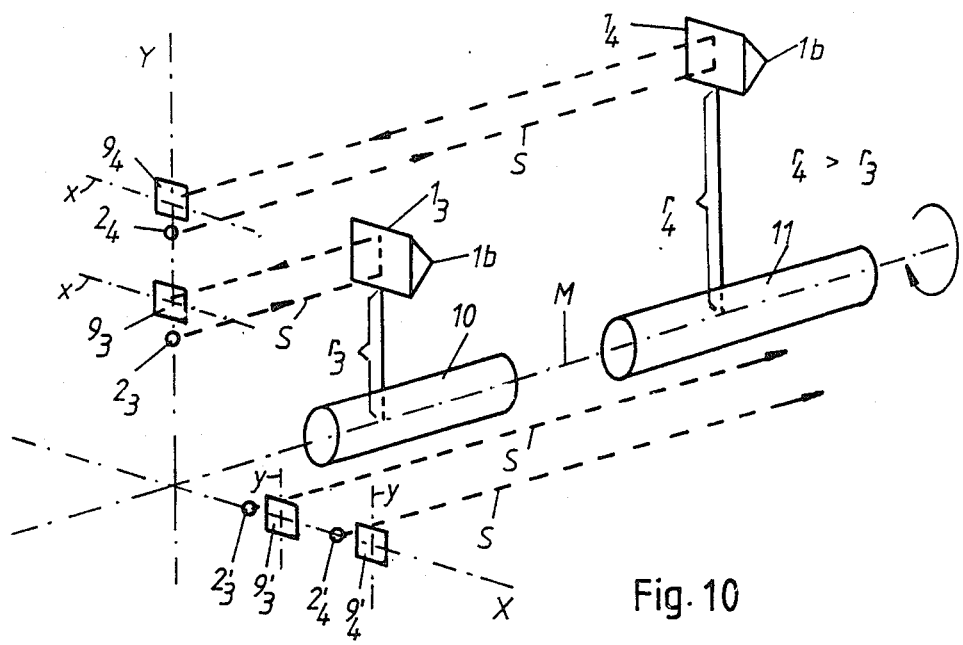
FIG. 10 shows a further embodiment of the apparatus in accordance with the invention in a perspective, diagrammatic view.
Figure 11:
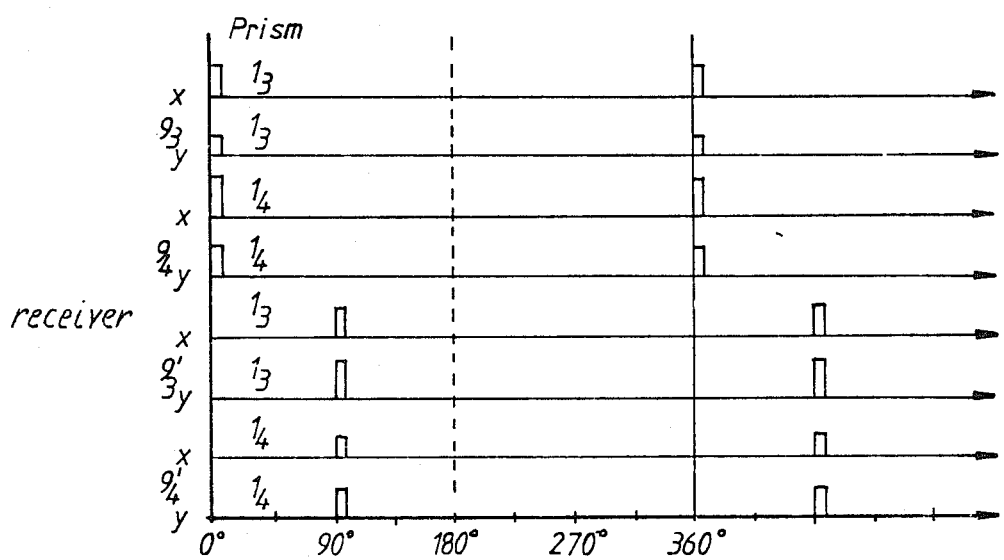
FIG. 11 shows a signal graph relating to FIG. 10.

FIGS. 10 and 11 and also 12 and 13 diagrammatically represent two further working examples of the apparatus of the invention and pulse graphs applying therefor.

In the working example of FIGS. 10 and 11, like the case of the embodiment of FIGS. 8 and 9, one prism $1_3$ and $1_4$ is mounted, but in this case the prisms assume the same angular position with respect to the common rotating shafts and the shafts have such a different distance that they do not cover each other. For each prism $1_3$ and $1_4$ there are two source and receiver pairs $2_3$ and $9_3$ of furthermore $2_3'$ and $9_3'$, or in the other case $2_3$ and $9_4$ and furthermore $2_4'$ and $9_4'$ at whose receiver output terminals the pulses will occur in the same sequence indicated in FIG. 1.

Together with their associated source and receiver pairs $2_3$, $9_3$, $2_3'$ and $9_3'$ and furthermore $2_4$, $9_4$, $2_4$ and $9_4$ the prisms $1_3$ and $1_4$ may be angularly offset in relation to each other. Here pairs of signals would appear at the x, y output terminals of the separate ray receivers one after the other.

It is also an advantage that in the working examples of the invention described owing to the special arrangement of the prisms and the pairs of sources and receivers the time elapsing between the appearance of the first pulse and the appearance of the last pulse of the group of pulses produced for each revolution of the shaft is smaller than the time between this last pulse and the re-appearance of the first pulse, because, as a result, the start of the group of pulses and the end thereof may be clearly seen so that it also possible to see which pulses come from which ray receivers and their output terminals without any additional means such as clocking devices and the like.

Since each shaft 10 and 11 is practically monitored as such in the X, Y and M reference system it is not, as a matter of principle, necessary to have a common reference system applying for the two shafts. In fact each shaft could have its own reference system, in which it would cooperate with the source and receiver pairs designated to it. In this case a critical condition would be characterized by a change exceeding a permissible limit in the position of the one and/or of the other shaft in its respective reference system.

We claim:

1. Apparatus for detecting and monitoring changes in either parallel or angular offset of the position of a shaft rotating in a spatially fixed reference system about its longitudinal axis, said apparatus comprising:

a ray source emitting a light ray generally parallel to the shaft to positions of measurement circumferentially spaced by approximately 90° about the shaft;

a rectangular prism or corresponding optical system fixed to the shaft, said prism having a hypotenuse plane facing the light ray, and an apex extending essentially parallel to a normal tangent to the shaft circumference;

a ray receiver positioned to receive the reflected signal, said receiver producing two signals corresponding to the X and Y coordinates, respectively, of said received reflected signal with respect to said ray receiver;

characterized in that each position of measurement of a ray source—ray receiver—pair ($2_1$, $9_1$, $2_2$, $9_2$, $2_3$, $9_3$, $2_4$, $9_4$, $2_3'$, $9_3'$, $2_4'$, $9_4'$), is provided for the emmission of a light ray (S) to the at least one prism ($1_1$, $1_2$; $1_3$, $1_4$) associated therewith and for receiving the light ray (S') reflected by the said associated prism when passing that position of measurement.

2. Apparatus as in claim 1 is employed for monitoring the relative coaxial position of two shafts, said apparatus employing a prism, or the like optical system secured to each shaft, each prism cooperating with two ray source receiver pairs.

3. The apparatus as claimed in claim 2 characterized in that a respective prism ($1_1$ and $1_2$) is mounted on each of the two shafts (10 and 11), which are at approximately the same radial distance from their respective shaft (10 or 11) and are offset in the circumferential direction of the shafts (10 and 11) in relation to each other and two common source and receiver pairs ($2_1$, $9_1$; $2_2$ and $9_2$) are provided for the two prisms ($1_1 1$ and $1_2$).

4. The apparatus as claimed in claim 2 characterized in that on each of the two two shafts (10 and 11) a respective prism ($1_3$ and $1_4$) is mounted and the prisms ($1_3$ and $1_4$) are arranged at different radial distances from the shaft thereon and for each prism ($1_3$ and $1_4$) there are two respective source and receiver pairs (2 and 9) which are offset by 90° in relation to each other.

5. The apparatus as claimed in claim 4 characterized in that the prisms ($1_1$ and $1_2$) are arranged in approximately the same angular positions on the shafts (10 and 11).

6. The apparatus as claimed as in claim 1 characterized in that the coordinate axes of the coordinate systems are radially and perpendicularly arranged in relation to the center axes of the shafts and the ray receivers consist of two-dimensional analog photoelectric semiconductor position detectors with a corresponding coordinate arrangement.

7. The apparatus as in claim 1 characterized in that the ray receivers (9) are placed behind lenses for reducing the light ray deflection.

8. The apparatus as in claim 1 characterized in that the output of each ray receiver (9) is connected with means for producing a display of the position of the point of incidence of the light ray and/or for producing an alarm signal when an adjustable displacement is exceeded.

9. The apparatus as in claim 1 characterized in that the ray sources (2) each consist of a laser diode with optical means for producing a collimated light ray.

10. The apparatus as in claim 1 characterized by adjusting means in order to adjust the points of incidence of the light ray on the receivers (9).

11. The apparatus as in claim 1 characterized by infrared filters to keep out interfering daylight and placed in the ray path between the ray sources (2) and the ray receivers (9).

* * * * *